Nov. 22, 1938.    N. POFFENBERGER    2,137,587
SEPARATION OF PHENOLS
Filed May 13, 1937
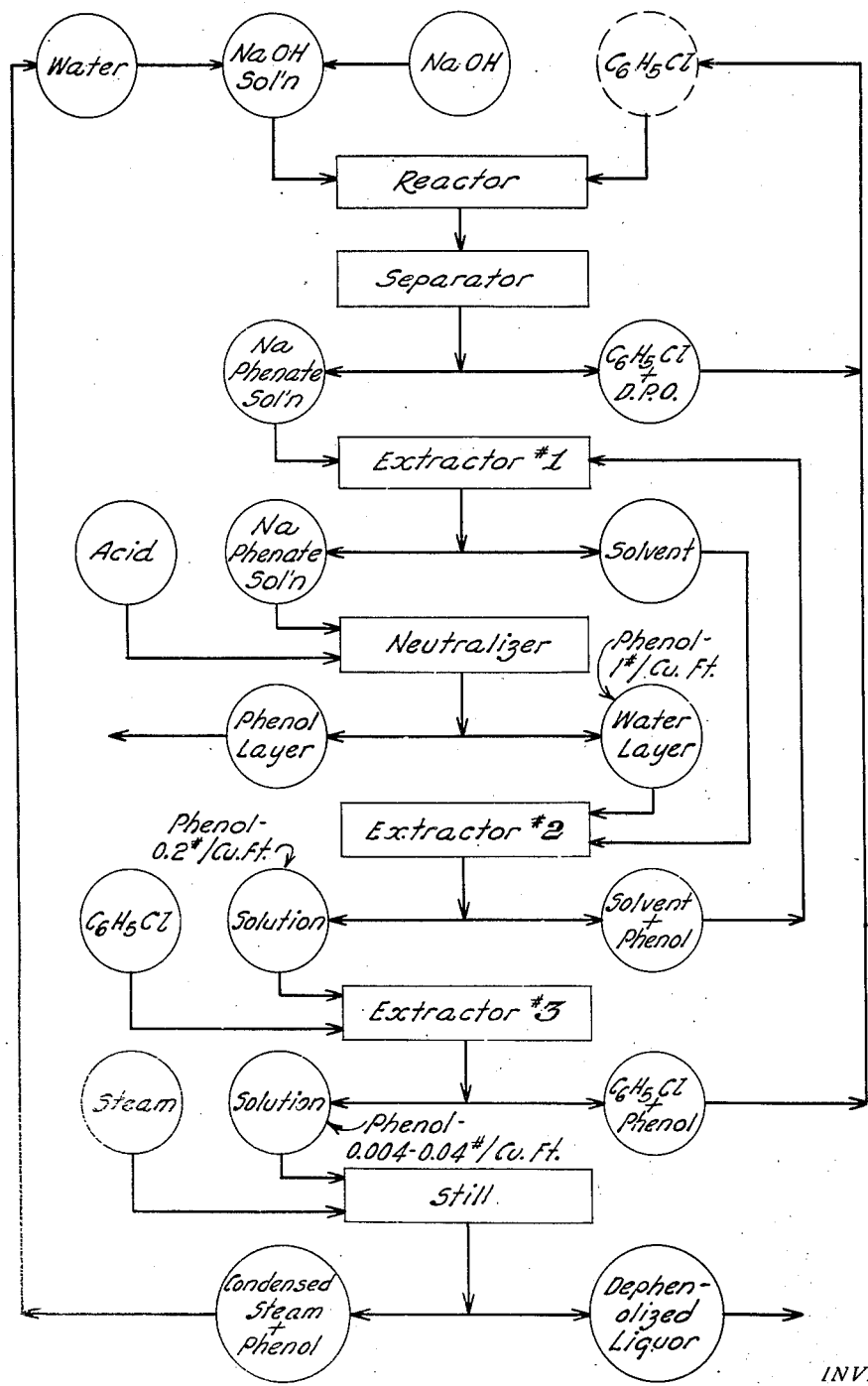
INVENTOR
Noland Poffenberger
BY Griswold & Burdick
ATTORNEYS Patented Nov. 22, 1938

2,137,587

UNITED STATES PATENT OFFICE 2,137,587

SEPARATION OF PHENOLS

Noland Poffenberger, Midland, Mich., assignor to The Dow Chemical Company, Midland, Mich., a corporation of Michigan Application May 13, 1937, Serial No. 142,420

6 Claims. (Cl. 260—629)

The present invention relates to methods of separating phenols from aqueous liquors which accompany them in various processes of making phenols synthetically, or in processes of recovering phenols from crude products of the distillation of coal, and the like.

For example, in the manufacture of a phenol by the hydrolysis of the corresponding halogenated aromatic hydrocarbon, such halogenated hydrocarbon is hydrolyzed by heating under pressure with an aqueous solution of an alkali, whereby there is obtained an aqueous alkaline solution of the alkali metal salt of the phenol. The phenol is recovered from the aqueous solution by acidifying the latter, whereupon two liquid layers are formed, an oil layer containing most of the phenol and a water layer containing the dissolved inorganic salts and also a small amount of the phenol. The oil layer is separated by decantation, but it still remains to recover the small amount of phenol from the water layer. The recovery of such phenol is important, not only to increase the yield of product but also to remove phenol as completely as possible from the tail liquors, so that they may be disposed of by running to waste without creating a nuisance due to contamination of water courses.

The usual method of removing phenols from such aqueous liquors has been to distill with steam. Such method is unduly costly and wasteful of steam, because, in the case of phenol itself, about ten pounds of steam is required to vaporize one pound of phenol. In the case of cresols and higher phenols, the steam requirement for vaporization of the phenol is still greater. It is desirable to provide a method which is equally effective, but avoids such wasteful use of steam.

Another method of recovering phenols from aqueous liquors employs extraction with a water-immiscible solvent in which the phenol is more soluble than in water. In such method, however, the solvent subsequently must be distilled from the phenol to recover the latter, the steam requirement for such distillation largely nullifying the saving in steam which the extraction method theoretically provides. A further objection to the extraction method, if depended on alone, is that it is incapable of removing all of the phenol from the aqueous liquor. In many cases it is necessary to remove substantially the last trace of phenol from the liquor before the latter can be allowed to run to waste, so as to avoid risk of illegal stream pollution.

A similar problem exists in connection with the manufacture of phenols by the "fusion" process in which a sulphonated aromatic hydrocarbon is fused with caustic alkali, the fusion mixture dissolved in water and the water solution treated in similar manner to that already described to recover the phenol therefrom. The problem is also found in methods for dephenolizing gas liquors and the like.

It is an object of the invention to provide an improved method of separating phenols from aqueous alkaline liquors containing the same, which reduces the steam consumption to no more than a small fraction of that required in the known methods, while at the same time effecting a substantially complete dephenolization of the aqueous liquor. Another object is to enable a solvent extraction of phenol from the aqueous liquor to be carried out without necessity for distilling the solvent to separate the phenol from the solvent. Other objects and advantages will appear as the description proceeds. The improved method or process constituting the invention is described in the annexed drawing and following detailed specification.

In said annexed drawing, the single figure is a flow sheet showing the movement of material in one preferred form of the method or process.

For purpose of illustration, the invention will be described with reference to the process, wherein phenol is produced by hydrolyzing chlorobenzene with an aqueous sodium hydroxide solution, but it will be understood that the invention is not limited thereby.

According to prior practice in making phenol by the aforesaid method, chlorobenzene is hydrolyzed by heating under pressure at a temperature of about 350° to 400° C. with about two and one-half equivalents of a 10–15 per cent sodium hydroxide solution. The reaction product is cooled and discharged into a separator, in which unreacted chlorobenzene, diphenyl oxide and other alkali-insoluble products formed in the reaction separate as a liquid layer and are decanted from the alkaline aqueous solution of sodium phenate. The phenate solution, which contains about 10 to 12 pounds of phenol per cubic foot, is then acidified with a mineral acid to liberate the phenol, the latter collecting largely as a separate liquid layer. The phenol layer is decanted from the aqueous layer, about 90 per cent of the total phenol being in the phenol layer and about 10 per cent remaining dissolved in the water layer, which may contain, for example, about one pound of phenol per cubic foot. In order to recover the phenol from the water layer by steam distillation in the usual way would require about 10 to 12 pounds of steam per pound of phenol. I have found, however, that this steam consumption can be reduced to a very small per cent of the above figure by suitable procedure involving a combination of extraction and steam distillation, as hereinafter described.

The drawing shows a continuous mode of procedure embodying the invention. Chlorobenzene and an aqueous sodium hydroxide solution are added to a reactor, wherein the hydrolysis is carried out by heating to a reaction temperature under the general conditions already stated, and the reaction product is run to a separator to separate the aqueous sodium phenate solution from the oily layer consisting principally of chlorobenzene and diphenyl oxide, which is returned for reuse in the process. The strongly alkaline sodium phenate solution is removed to an extractor 1 in which it is intermixed with an immiscible solvent, e. g. benzene or chlorobenzene, containing some dissolved phenol which is derived from a later step, as will hereinafter appear. In extractor 1 the alkaline sodium phenate solution extracts the phenol from the solvent, converting it to sodium phenate, which adds to that already in solution. The solvent is then separated from the aqueous sodium phenate solution to be used in a later step, while the solution is led to a neutralizer or acidifier, wherein it is treated with a mineral acid to neutralize the alkali and decompose the sodium phenate, liberating free phenol. For the mineral acid either hydrochloric acid or sulphuric acid may be used, or the solution may be treated with a gaseous acid, such as sulphur dioxide or carbon dioxide, in known manner. After neutralization the phenol layer separates and is decanted from the water layer, such crude phenol product being removed from the process to be purified by usual procedure. The water layer from the neutralizer, containing about one pound of phenol per cubic foot, is forwarded to an extractor 2, wherein it is extracted with the solvent from extractor 1. By using about equal volumes of solvent and aqueous liquor in extractor 2 approximately 80 to 85 per cent of the phenol can be extracted from the aqueous liquor under conditions of continuous operation by which the solvent is circulated between extractors 1 and 2, thus reducing the phenol content of the liquor to, say, 0.2 pound per cubic foot. The solvent layer from extractor 2, containing dissolved phenol, is returned to extractor 1, wherein the phenol is extracted by means of the aqueous alkali, thus returning such phenol to the system.

The aqueous liquor from extractor 2, containing about 0.2 pound of phenol per cubic foot, can now be distilled with steam, if desired, to remove the remainder of the phenol and leave a dephenolized liquor which can be run to waste without danger of stream pollution due to phenol. Such procedure would effect a saving of about 80 per cent of the steam required for removing phenol from the original aqueous liquor prior to the extraction step.

However, I prefer to make use of another extraction step at this point to reduce the phenol content of the aqueous liquor still further. The aqueous liquor from extractor 2 is led to extractor 3, wherein it is extracted with fresh chlorobenzene, reducing the phenol content of the liquor to a value from about 0.04 pound to as low as 0.004 pound per cubic foot. This chlorobenzene extract containing a small amount of phenol is then conveyed to the first step for use as raw material to be hydrolyzed by sodium hydroxide solution. The aqueous liquor from extractor 3 can now be steam distilled to remove the last traces of phenol, as well as any chlorobenzene, with an expenditure of less than 5 per cent of the steam required to distill phenol from the original water layer. The distillate, containing the remainder of the phenol removed from the aqueous liquor, may be employed in making up the sodium hydroxide solution used in the hydrolysis step, while the dephenolized liquor may be disposed of as desired. Since the phenol content of the liquor is very small, however, the liquor may in some cases be run to waste without necessity for distilling with steam, or it may be treated with active charcoal to remove last traces of phenol.

The solvent which is recycled in extractors 1 and 2 may be any water-immiscible organic solvent capable of dissolving phenols readily, examples of which are benzene, chlorobenzene, kerosene, carbon tetrachloride, ethylene chloride or similar halogenated hydrocarbon solvent. In any particular case, a solvent will be chosen which varies sufficiently in specific gravity from the aqueous liquor, so that a ready separation of solvent and water layer is obtained. For example, when the neutralization of the strong phenate liquor is done with hydrochloric acid, the specific gravity of the resulting salt solution is such that benzene is a satisfactory solvent. When sulphuric acid, sulphur dioxide or carbon dioxide is used in the neutralization step, either benzene or chlorobenzene are suitable extraction solvents.

Similar procedure to that described above may be used to recover phenol from the alkaline solution of an alkali metal phenate obtained in the above-mentioned fusion process of making a phenol, the combination of neutralizing and extracting steps being carried out in substantially the manner described. Likewise the procedure is adapted for recovering phenols from alkali metal phenate solutions containing sufficient free alkali, such as are obtained in stripping phenols from coal tar distillates, ammonia still liquors, and the like. In such case the alkaline phenate solution is acidified, the phenol layer removed, and the water layer extracted with a phenol solvent. The solvent containing the phenol is then extracted by more of the original alkaline phenate liquor to remove phenols and the solvent used again to extract phenol from a further quantity of the acidified liquor. The aqueous liquor, after extraction of phenol therefrom by the solvent, may be subjected to a second extraction followed by steam distillation, or it may be steam distilled directly after the first extraction. In either case a final aqueous liquor may be obtained which is completely dephenolized, and which may be safely run to waste into water courses, or may be disposed of in other ways, or worked up to recover dissolved salts, as desired.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:—

1. The method of separating a phenol from aqueous alkaline solution of an alkali metal phenate which comprises acidifying the solution, whereby two liquid layers are formed consisting of a phenol layer and a water layer containing some dissolved phenol, removing the phenol layer, extracting the phenol from the water layer with a water-immiscible solvent for the phenol, and extracting the phenol from the solvent with the original alkaline solution prior to acidifying the same.

2. In a method of separating a phenol from an aqueous alkaline solution of an alkali metal phenate, the steps which consist in acidifying such solution to liberate the phenol, forming two liquid layers consisting of a phenol layer and a water layer containing some dissolved phenol, removing a major proportion of the phenol dissolved in said water layer by extracting with a water-immiscible solvent for the phenol, removing the phenol from such solvent by extracting with the original alkaline phenate solution prior to acidifying the latter, and separating residual phenol from said water layer by distilling with steam.

3. In the manufacture of a phenol, wherein a halogenated aromatic hydrocarbon is hydrolyzed by heating under pressure with an aqueous alkali metal hydroxide solution, the method of recovering such phenol from the reaction product which comprises separating unreacted halogenated hydrocarbon and alkali-insoluble products from the aqueous alkaline solution of the alkali metal phenate, acidifying such solution, whereby two liquid layers are formed consisting of a phenol layer and a water layer containing some dissolved phenol, removing the phenol layer, extracting the major proportion of the phenol from the water layer with a water-immiscible solvent for the phenol, extracting such phenol from the solvent with said alkali metal phenate solution prior to acidifying the same, and removing residual phenol from said water layer by distilling with steam.

4. In the manufacture of phenol, wherein chlorobenzene is hydrolyzed by heating under pressure with an aqueous sodium hydroxide solution, the method of recovering phenol from the reaction product which comprises separating unreacted chlorobenzene and alkali-insoluble products from the aqueous alkaline solution of sodium phenate, acidifying such solution, whereby two liquid layers are formed consisting of a phenol layer and a water layer containing some dissolved phenol, removing the phenol layer, extracting the major proportion of dissolved phenol from the water layer with a water-immiscible solvent, extracting such phenol from the solvent with said sodium phenate solution prior to acidifying the same, and removing residual phenol from said water layer by distilling with steam.

5. The method according to claim 4, in which the water layer after extraction with the water-immiscible solvent is subjected to a second extraction with chlorobenzene to remove a further amount of phenol, such chlorobenzene then being returned to the principal reaction to be hydrolyzed with sodium hydroxide solution.

6. The method according to claim 4, in which the water layer after extraction with the water-immiscible solvent is subjected to a second extraction with chlorobenzene to remove a further amount of phenol, such chlorobenzene then being returned to the principal reaction to be hydrolyzed with sodium hydroxide solution, and the water layer after said second extraction being finally dephenolized by distilling with steam, dissolving sodium hydroxide in the distillate therefrom, and employing such solution of sodium hydroxide for hydrolyzing chlorobenzene in the principal reaction.

NOLAND POFFENBERGER.